(12) United States Patent
Chen et al.

(10) Patent No.: US 9,073,065 B2
(45) Date of Patent: Jul. 7, 2015

(54) CYCLONE DEVICE FOR SEPARATING STICKY MATERIAL FROM GAS STREAM

(71) Applicant: Institute of Nuclear Energy Research, Atomic Energy Council, Executive Yuan, R.O.C., Taoyuan County (TW)

(72) Inventors: Wen-Hua Chen, New Taipei (TW); Yong-Yan Xu, Taoyuan County (TW); Ron-Hsine Chang, Taichung (TW)

(73) Assignee: INSTITUTE OF NUCLEAR ENERGY RESEARCH, ATOMIC ENERGY COUNCIL, Lungtan, Taoyuan (TW)

(*) Notice: Subject to any disclaimer, the term of this patent is extended or adjusted under 35 U.S.C. 154(b) by 297 days.

(21) Appl. No.: 13/889,480

(22) Filed: May 8, 2013

(65) Prior Publication Data

US 2014/0116014 A1    May 1, 2014

(30) Foreign Application Priority Data

Oct. 30, 2012  (TW) .............................. 101140216 A

(51) Int. Cl.

| B01D 41/00 | (2006.01) |
|---|---|
| B04C 5/22 | (2006.01) |
| B01D 46/00 | (2006.01) |
| B01D 46/10 | (2006.01) |
| F24F 3/16 | (2006.01) |
| F24F 1/00 | (2011.01) |

(52) U.S. Cl.
CPC .............. *B04C 5/22* (2013.01); *B01D 46/0065* (2013.01); *B01D 46/10* (2013.01); *B01D 46/0075* (2013.01); *F24F 2003/1639* (2013.01); *F24F 1/0007* (2013.01)

(58) Field of Classification Search
CPC ............... B01D 46/0065; B01D 46/10; B01D 46/0075; F24F 2003/1639; F24F 1/0007
USPC ........................................... 55/295–298, 300
See application file for complete search history.

(56) References Cited

U.S. PATENT DOCUMENTS

| 2,671,248 | A | * | 3/1954 | Wallace | 55/296 |
|---|---|---|---|---|---|
| 3,296,778 | A | * | 1/1967 | Dock | 55/296 |
| 3,495,383 | A | * | 2/1970 | Nelson | 96/243 |
| 5,215,559 | A | * | 6/1993 | Eriksson | 55/392 |
| 5,271,751 | A | * | 12/1993 | Lagler | 55/295 |
| 5,562,758 | A | * | 10/1996 | Awaji | 95/282 |
| 5,616,156 | A | * | 4/1997 | Keersmaekers | 55/282.5 |
| 5,922,092 | A | * | 7/1999 | Taylor | 55/295 |
| 6,171,353 | B1 | * | 1/2001 | Park et al. | 55/282.2 |
| 2009/0282858 | A1 | * | 11/2009 | Demetri | 62/401 |

* cited by examiner

*Primary Examiner* — Dung H Bui
(74) *Attorney, Agent, or Firm* — Jackson IPG PLLC; Demian K. Jackson

(57) ABSTRACT

A cyclone device for separating a sticky material from a gas stream, comprising a tin body; an introducing tube, connected to the tin body and arranged on a facet of the tin body; a central exhaust pipe, arranged within the tin body on a top position thereof, a conical tin connected to a bottom of the tin body at one end and having a particle discharging exit at the other end; a supporting wheel set, arranged within the tin body and adjacent to an end of the conical tin; and a scraping mechanism arranged movably on the supporting wheel set.

4 Claims, 6 Drawing Sheets

CYCLONE DEVICE FOR SEPARATING STICKY MATERIAL FROM GAS STREAM

FIELD OF THE INVENTION

The present invention is related to a cyclone device for separating a sticky material from a gas stream. Particularly, the present invention is related to a cyclone device for separating a sticky material from a gas stream, in which when a gas stream mixed with a sticky material is introduced from a guiding tube into a tin body along a tangent direction, a scraping mechanism therein is driven by the gas stream to rotate, to enable the gas stream to strike a spherosome and internal conical wall facets so that a portion of the sticky material goes downwards to discharge at a particle exit while the other still remains on the internal wall facet of the tin body, the latter portion is then scraped out by the scraping mechanism and also discharged through the same, and the clean air portion of the gas stream is discharged from a central exhaust pipe, by which the sticky material is effectively separated from the gas stream and the stickiness issue in the gas flow is successfully overcome.

DESCRIPTION OF THE RELATED ART

Solid-liquid separation and gas and solid separation techniques are very common in the industry. Among them, the case where the solid material is sticky or has a high water-containment always has the troublesome state that the solid material sticking on an internal wall of a cyclone device. Such cases may appear on the following exemplified situations: a steam explosion pretreatment processing system in a bioethanol factory, a solid-gas separation application in a half-dry scrubber tower and a mist spray and drying application. At this time, a separation process with respect to separation of a sticky material and a gas stream is generally required.

In a general cyclone device, it is operated based on the principle that when particles of the sticky material is mixed in a gas stream in a high rotating speed, a centrifugal force on each of the particles is much larger than the gravity and a centrifugal subside speed of the respective particles becomes larger as the gas stream rotates, enabling the solid-gas separation to be resulted in.

Further, when the gas stream mixed with solid particles enters a hammer tin from an introducing tube of a tin of the cyclone device along a tangent direction, the gas stream and thus the particles rotate in the hammer tin and collide with an internal wall portion of the tin body, enabling the gas stream portion containing the particles downwards to a particle collection tube.

At the same time, the clean gas stream portion discharges through an exhaust pipe of the separation device. The cyclone device has a separation efficiency coming as a proportional relationship with respect to the diameter of each of the particles. Generally, a diameter of the particle larger than 30 μm may correspond to a separation efficiency up to 99%, while no more than 5% for the particle diameter smaller than 5 μm.

In addition, when the particles mixed in the gas stream are sticky, such as in the cases of a steam explosion pretreatment processing system in a bioethanol factory, a solid-gas separation application in a half-dry scrubber tower and a mist spray and drying application, the separation process is required to be applied. When the gas stream mixed with solid particles enters the hammer tin from the cyclone device, the gas stream and thus the particles rotate in the hammer tin and collide with an internal wall portion of the tin body, enabling the gas stream portion containing the particles downwards to a particle collection tube, but with some such portion sticking on the internal wall of the cyclone device. Thus, the clean gas stream portion discharges through the central exhaust pipe of the cyclone device. However, the particles sticking on the internal wall of the tin and conical tin may lead to a rapid attenuation of the efficiency of the cyclone device, and even to a total failure.

In view of the drawbacks mentioned above, the inventor of the present invention provides a method for enhancing a cyclone device for separating a sticky material from a gas stream, after many efforts and researches to overcome the shortcoming encountered in the prior art.

SUMMARY OF THE INVENTION

It is, therefore, an object of the present invention to provide a cyclone device for separating a sticky material from a gas stream, in which when a gas stream mixed with a sticky material is introduced from a guiding tube into a tin body along a tangent direction, a scraping mechanism is driven by the gas stream to rotate, to enable the gas stream to strike a spherosome and internal conical wall facets so that a portion of a sticky material goes downwards to discharge at a particle exit while the other still remains on the internal wall facet of the cyclone device, the latter portion is then scraped out by a rotating body of the scraping mechanism and also discharged through the same, and the clean air portion of the gas stream is discharged from a central exhaust pipe, by which the sticky material is effectively separated from the gas stream and the stickiness issue in the gas flow is successfully overcome.

To achieve the object of the present invention stated above, The cyclone device for separating a sticky material from a gas stream comprises: a tin body; an introducing tube communicated to the tin body and arranged on a facet of the tin body; a central exhaust pipe arranged within the tin body on a top position thereof; a conical tin having a first end and a second end and communicated to a bottom of the tin body at the first end and having a particle discharging exit at the second end; a supporting wheel set arranged within the tin body and adjacent to an end of the conical tin; and a scraping mechanism arranged movably on the supporting wheel set.

In an embodiment, a supporting body frame is arranged on the top position of the tin body for fixing the central exhaust pipe.

In an embodiment, the supporting wheel set includes a plurality of supporting seats capable of horizontal and vertical directions adjustment for supporting the scraping mechanism.

In an embodiment, the scraping mechanism comprises an upper fixation ring, a middle fixation ring arranged below the upper fixation ring, and a lower fixation ring below the middle fixation ring, a plurality of powder body scraping plates arranged on an outer edge of the upper, middle and lower fixation rings, a plurality of first steering-wheel sets arranged adjacent to the upper fixation ring, a plurality of second steering-wheel sets arranged adjacent to the middle fixation ring, and a plurality of gliding wheel sets arranged between the lower fixation ring and the supporting wheel sets.

In an embodiment, each of the powder scraping plates has a plurality of cylindrical scratch wiper devices arranged alternatively and each thereof has a saw shape.

In an embodiment, the first and second steering-wheel sets is arranged for providing a separation distance between the scraping mechanism and an internal wall facet of the tin body.

In an embodiment, each of the first and second steering-wheel sets comprises a ball bearing having a first facet and a second facet, a fixation bearing penetrating through the ball bearing and having a first end and a second end, a bearing cover arranged at the first and second ends of the fixation bearing, standing against the first and second facets, respectively, and having a side, a fixation axle penetrating through the side of the respective bearing cover and having a bottom, a resilient element having a first end and a second end and connected to the fixation axle at the first end and standing against the respective bearing cover at the second end, and a cover body arranged on the bottom of the fixation axle and fixed between the upper fixation ring and the lower fixation ring by using the fixation axle.

BRIEF DESCRIPTIONS OF THE DRAWINGS

DESCRIPTION OF THE PREFERRED EMBODIMENTS

Figure 1:
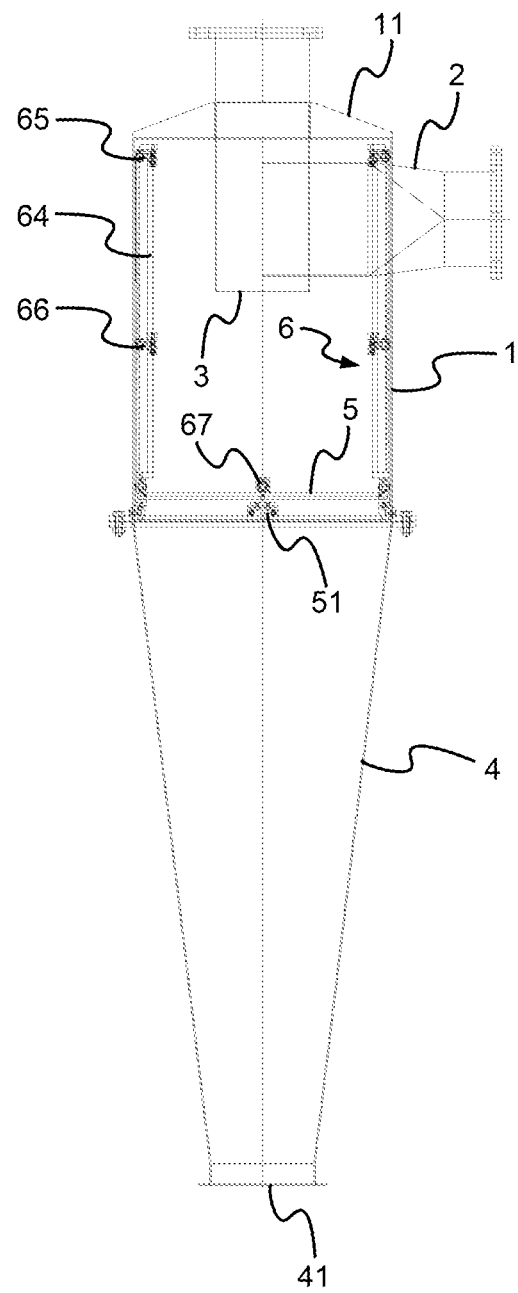
FIG. 1 is a schematic diagram of a fundamental architecture of a device according to the present invention.
Figure 2:
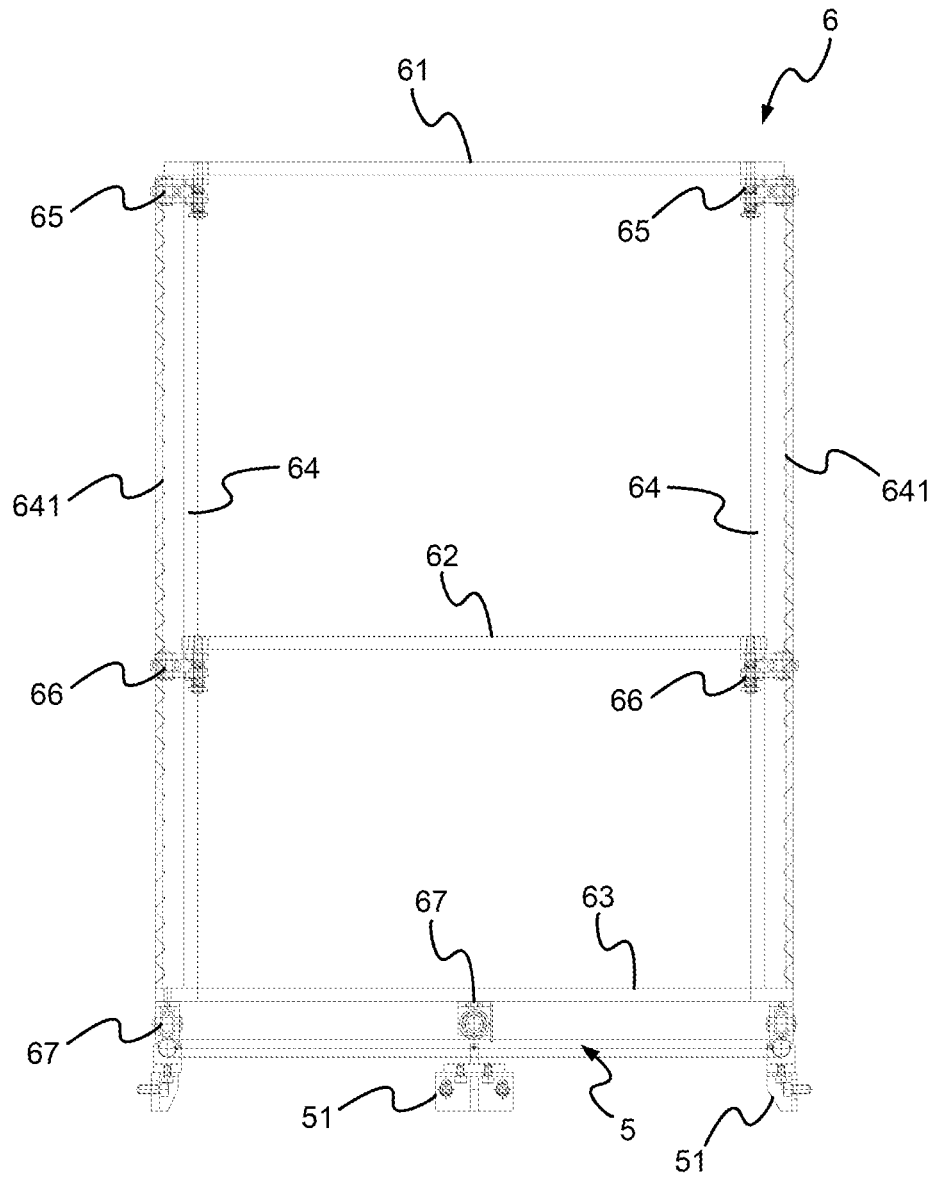
FIG. 2 is a schematic diagram of a scraping mechanism of the device according to the present invention.
Figure 3:
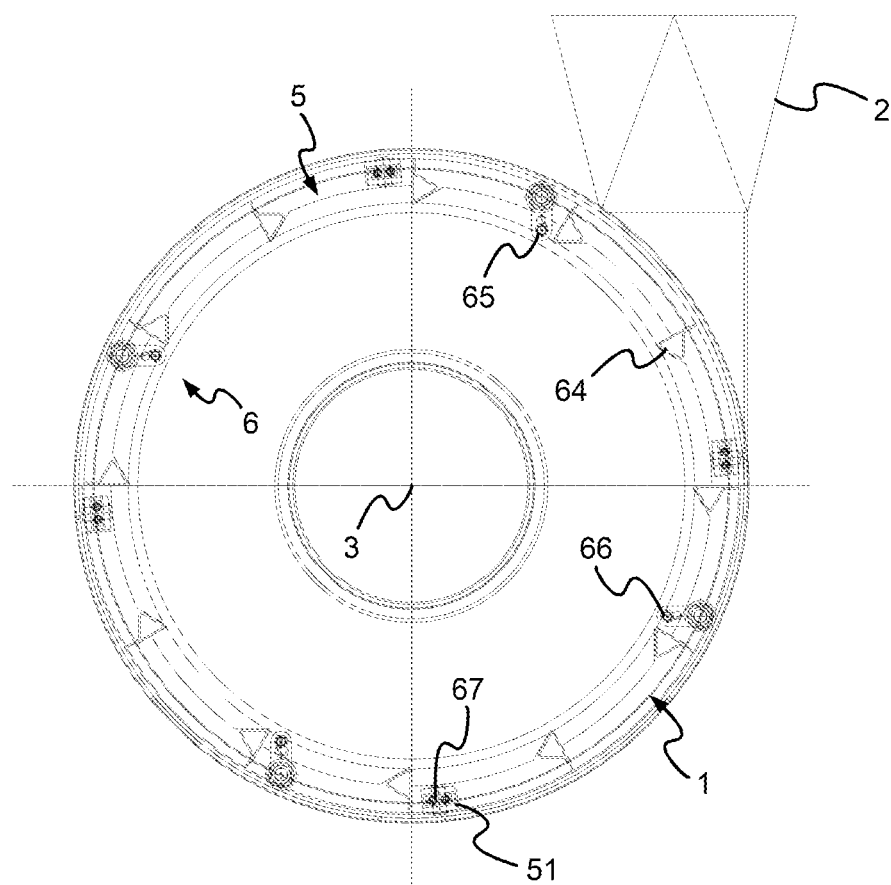
FIG. 3 is a vertical view of the device according to the present invention.
Figure 4:
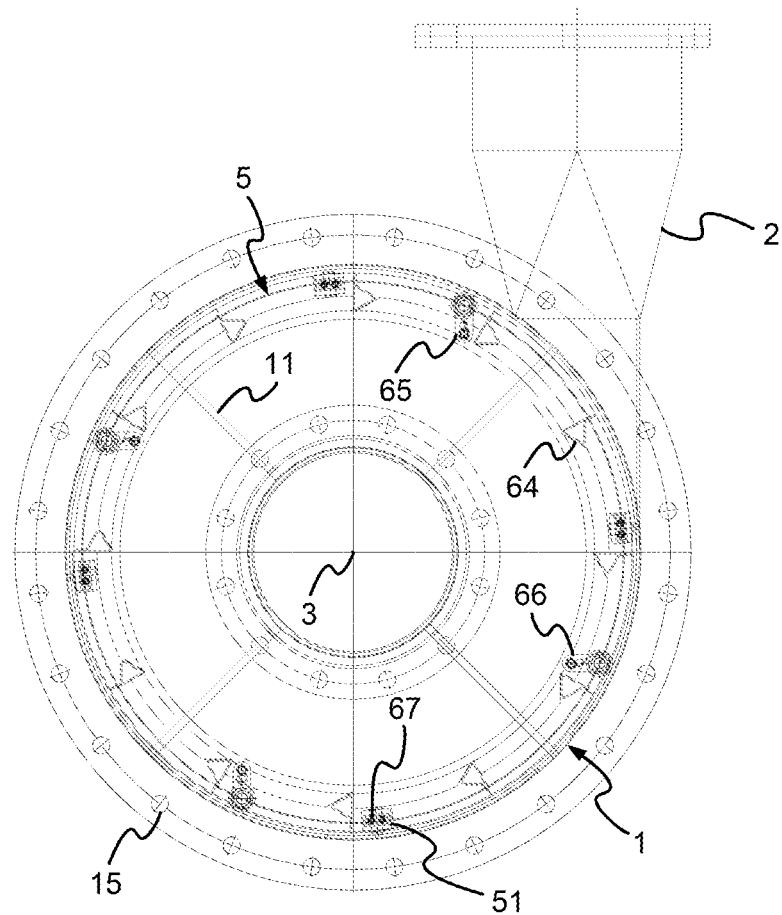
FIG. 4 is a sectional view of FIG. 3 according
Figure 5:
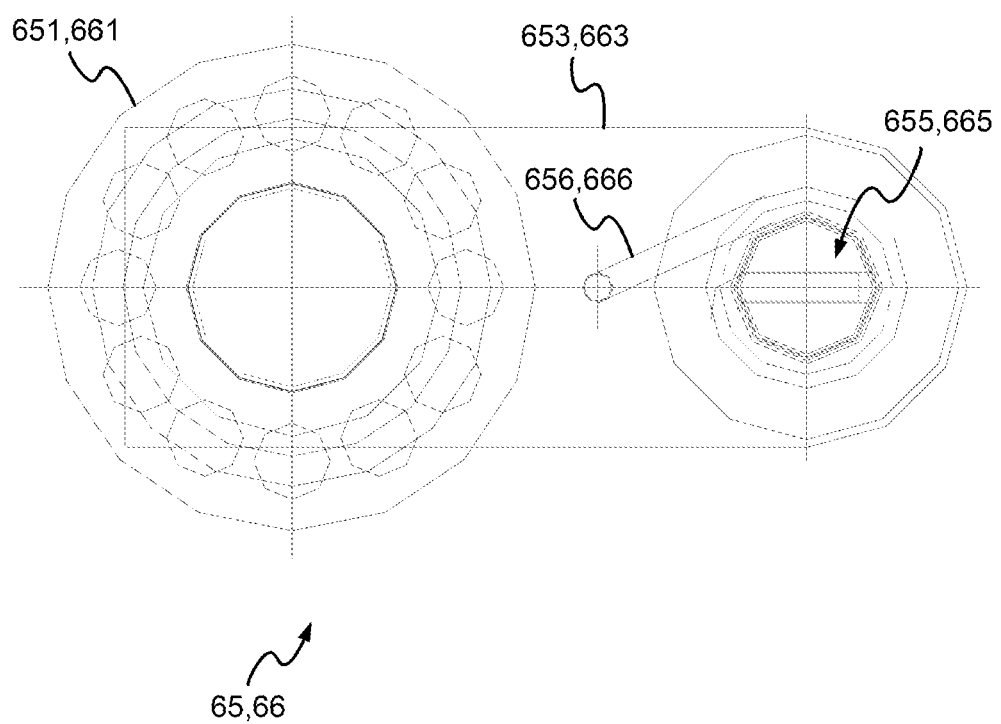
FIG. 5 is a vertical view of a first and a second steering-wheel sets of the device according to the present invention.
Figure 6:
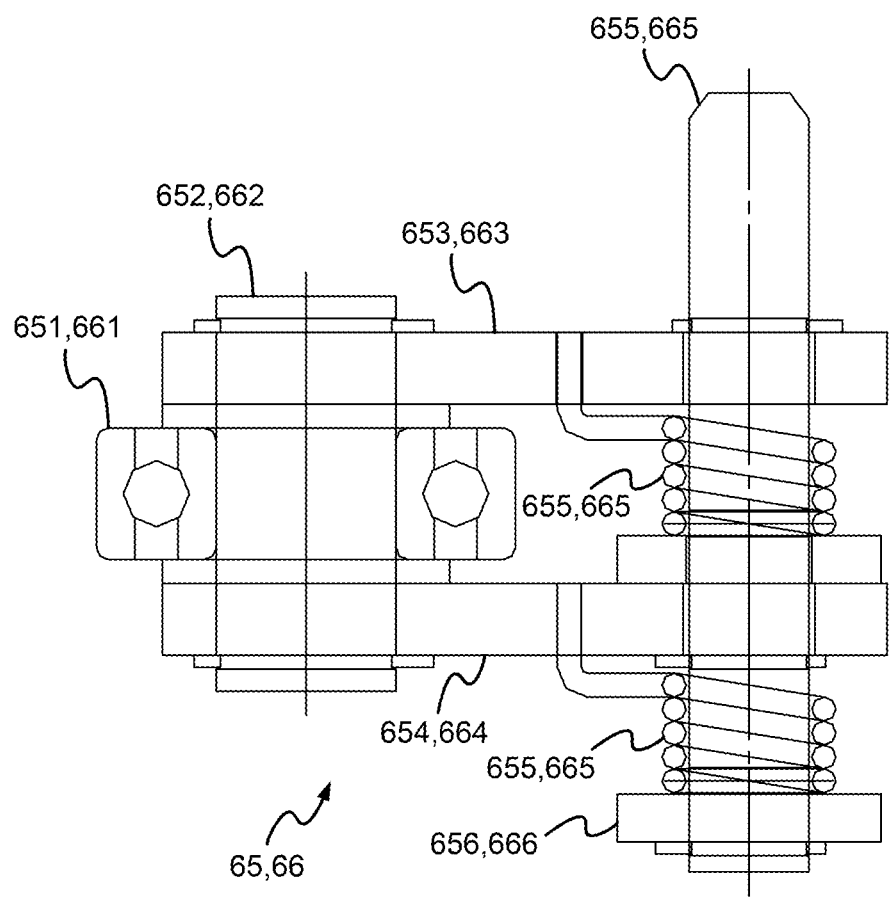
FIG. 6 is a lateral view of the first and second steering-wheel sets of the device according to the present invention.

Referring to FIGS. 1 through 6, FIG. 1, a schematic diagram of a fundamental architecture of a device according to the present invention, a schematic diagram of a scraping mechanism of the device according to the present invention, a vertical view of the device according to the present invention; a sectional view of the device according to the present invention, a vertical view of a first and a second steering-wheel sets of the device according to the present invention, a lateral view of the first and second steering-wheel sets of the device according to the present invention are shown, respectively.

In the present invention, the cyclone device for separating a sticky material from a gas stream comprises, as shown, a tin body 1, an introducing tube 2, a central exhaust pipe 3, a conical tin 4, a supporting wheel set 5, and a scraping mechanism 6.

On a top portion of the tin body 1, a supporting frame 11 is arranged.

The introducing tube 2 is communicated to a side of the tin body 1.

The central exhaust pipe 3 is arranged within the tin body 1 and fixed on the supporting frame 11.

The conical tin 4 is communicated with a bottom portion of the tin body 1 at one end and has a particle discharging exit 41 at the other end.

The supporting wheel set 5 is arranged within the tin body 1 and adjacent to an end of the conical tin 4. In an embodiment, a supporting body frame 11 is arranged on the top position of the tin body 1 for fixing the central exhaust pipe 3.

The supporting wheel set 5 includes a plurality of supporting seats 51, used for horizontal and vertical directions adjustment and for supporting the scraping mechanism 6.

The scraping mechanism 6 is arranged movably on the supporting wheel set 5.

The support seats 51 have a total number mainly depending on a size of the cyclone device (at least three sets), so that it can uniformly bear the weight of the scraping mechanism 6 with a sticky material accumulated thereon and the scraping mechanism 6 can be smoothly maintained in a gliding state on the supporting wheel set 5.

The scraping mechanism 6 comprises an upper fixation ring 61, a middle fixation ring 62 arranged below the upper fixation ring 61, and a lower fixation ring 63 below the middle fixation ring 62. Further, the scraping mechanism 6 comprises a plurality of powder body scraping plates 64, a plurality of first steering-wheel sets 65, a plurality of second steering-wheel sets 66 arranged adjacent to the middle fixation ring 62, and a plurality of gliding wheel sets 67.

The plurality of first steering-wheel sets 65 are arranged adjacent to the upper fixation ring 61. The plurality of second steering-wheel sets 66 are arranged adjacent to the middle fixation ring 62. The plurality of gliding wheel sets 67 are arranged between the lower fixation ring 63 and the supporting wheel sets 5.

The plurality of powder body scraping plates 64, are each arranged on an outer edge of the upper, middle and lower fixation rings 61, 62, 63 and has a plurality of cylindrical scratch wiper devices 641 each having a saw shape and arranged alternatively.

In an embodiment, the first and second steering-wheel sets 65, 66 are arranged for providing a separation distance between the scraping mechanism 6 and an internal wall facet of the tin body 1.

Each of the first and second steering-wheel sets 65, 66 comprises a ball bearing 651, 661, a fixation bearing 652, 662 penetrating through the ball bearing 651, 661, a bearing cover 653, 663 arranged at a corresponding end of the fixation axle 652, 662 and standing against two facets of the ball bearing 651, 661, a fixation axle 654, 664 penetrating through a side of the respective bearing cover 653, 663, a resilient element 655, 665 connected to the fixation axle 654, 664 at one of its two ends and standing against the respective bearing cover 653, 663 at the other end, and a cover body 656, 666 arranged on the bottom of the fixation axle 654, 664 and fixed between the upper fixation ring 61 and the lower fixation ring 63 by using the fixation axle 654, 664.

The first and second steering-wheel sets 65, 66 (at least three sets) provide a resilience by using the resilient element 655, 665, to maintain the ball bearing 651, 661 to closely press on an internal wall of the tin body 1 and thus maintain a constant distance between the scraping mechanism 6 and the tin body 1.

The powder scraping plate 64 has a number depending upon a size of the cyclone device and the introducing tube 2, respectively. In design, at least one set of powder scraping plates 64 is provided at an area the gas stream from the introducing tube 2 directly strikes thereon. Namely, the powder scraping plates 64 are preferably provided with six sets, so that the scraping mechanism 6 can be driven by the gas stream and thus rotated continuously.

The gliding wheel sets 67 have a number so that the weight of the powder scraping mechanism 6 plus the accumulated sticky powder (at least three sets) and the scraping mechanism 6 can be smoothly maintained gliding on the supporting wheel sets 5.

In operation, the introducing tube 1 and the supporting frame 11 are connected to some required channels. When a gas stream with solid sticky particles enters the tin body 1 along a tangent direction and the gas stream violently rotates in the tin body 1, the scraping mechanism 6 is driven by the gas stream to glide smoothly on the supporting wheel sets 67 on the aid of the gliding wheel sets 67. As such, the gas stream collides with the tin body 1 and an internal wall of a conical tin 4 below the tin body 1, enabling a portion of the particles to rotate downwards and then discharges from an exit 41. The remaining portion of the particles sticks on the internal wall of the tin body 1 and the conical tin 4, respectively. In this time, cylindrical scratch wiper devices 641 alternatively arranged on each of the powder scraping plates 64 of the scraping mechanism 6 are used to scrape out the sticky material on the internal wall of the tin body 1 and the dropped sticky material discharge at the particle exit 41. As such, the sticky material is separated with the gas stream, and the clean air portion discharges from the central pipe exhaust. In this manner, the troublesome issue of the internal wall of the tin body 1 being stuck with a material can be well overcome, achieving the purpose of continuously separating a sticky material from the gas stream.

In view of the description provided above, the cyclone device of separating a sticky material from a gas stream according to the present invention does overcome some shortcomings encountered in the prior art.

By using the method of the invention, when a gas stream mixed with a sticky material is introduced from the guiding tube into the tin body along a tangent direction, the scraping mechanism is driven by the gas stream to rotate, to enable the gas stream to strike the spherosome and internal conical wall facets so that a portion of a sticky material goes downwards to discharge at the particle exit while the other still remains on the internal wall facet of the tin body, the latter portion is then scraped out by the rotating body of the scraping mechanism and also discharged through the same, and the clean air portion of the gas stream is discharged from a central exhaust pipe, by which the a sticky material is effectively separated from the gas stream and the stickiness issue caused from the sticky material is successfully overcome.

The above described is merely examples and preferred embodiments of the present invention, and not exemplified to intend to limit the present invention. Any modifications and changes without departing from the scope of the spirit of the present invention are deemed as within the scope of the present invention. The scope of the present invention is to be interpreted with the scope as defined in the claims.

The invention claimed is:

1. A cyclone device for separating a sticky material from a gas stream, comprising:
    a tin body;
    an introducing tube communicated to the tin body and arranged on a facet of the tin body;
    a central exhaust pipe arranged within the tin body on a top position thereof;
    a conical tin having a first end and a second end and communicated to a bottom of the tin body at the first end and having a particle discharging exit at the second end;
    a supporting wheel set arranged within the tin body and adjacent to an end of the conical tin;
    a scraping mechanism arranged movably on the supporting wheel set;
    wherein the scraping mechanism comprises an upper fixation ring, a middle fixation ring arranged below the upper fixation ring, and a lower fixation ring below the middle fixation ring, a plurality of powder body scraping plates arranged on an outer edge of the upper, middle and lower fixation rings, a plurality of first steering-wheel sets arranged adjacent to the upper fixation ring, a plurality of second steering-wheel sets arranged adjacent to the middle fixation ring, and a plurality of gliding wheel sets arranged between the lower fixation ring and the supporting wheel sets;
    wherein each of the powder scraping plates has a plurality of cylindrical scratch wiper devices arranged alternatively and each thereof has a saw shape; and
    wherein each of the first and second steering-wheel sets comprises a ball bearng having a first facet and a second facet, a fixation bearing penetrating through the ball bearing and having a first end and a second end, a bearing cover arranged at the first and second ends of the fixation bearing, standing against the first and second facets, respectively, and having a side, a fixation axle penetrating through the side of the respective bearing cover and having a bottom, a resilient element having a first end and a second end and connected to the fixation axle at the first end and standing against the respective bearing cover at the second end, and a cover body arranged on the bottom of the fixation axle and fixed between the upper fixation ring and the lower fixation ring by using the fixation axle.

2. The device according to claim 1, wherein a supporting body frame is arranged on the top position of the tin body for fixing the central exhaust pipe.

3. The device according to claim 1, wherein the supporting wheel set includes a plurality of supporting seats capable of horizontal and vertical directions adjustment for supporting the scraping mechanism.

4. The device according to claim 1, wherein the first and second steering-wheel sets is arranged for providing a separation distance between the scraping mechanism and an internal wall facet of the tin body.

* * * * *